Dec. 30, 1969  W. A. YLINEN  3,486,344
CABLE-LAYING ATTACHMENT FOR ROAD GRADER VEHICLE
Filed May 1, 1968  2 Sheets-Sheet 1
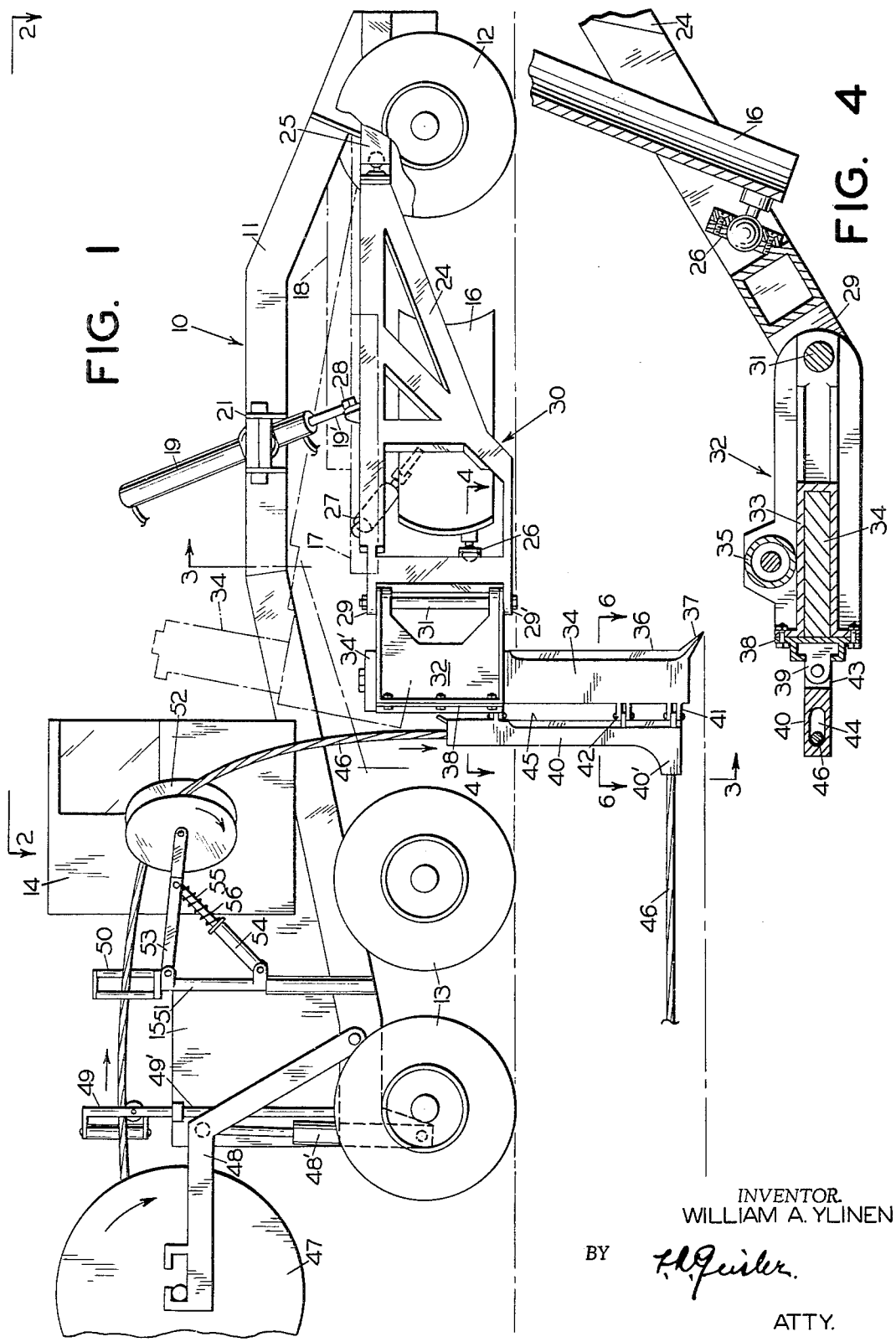
INVENTOR.
WILLIAM A. YLINEN
BY
ATTY.

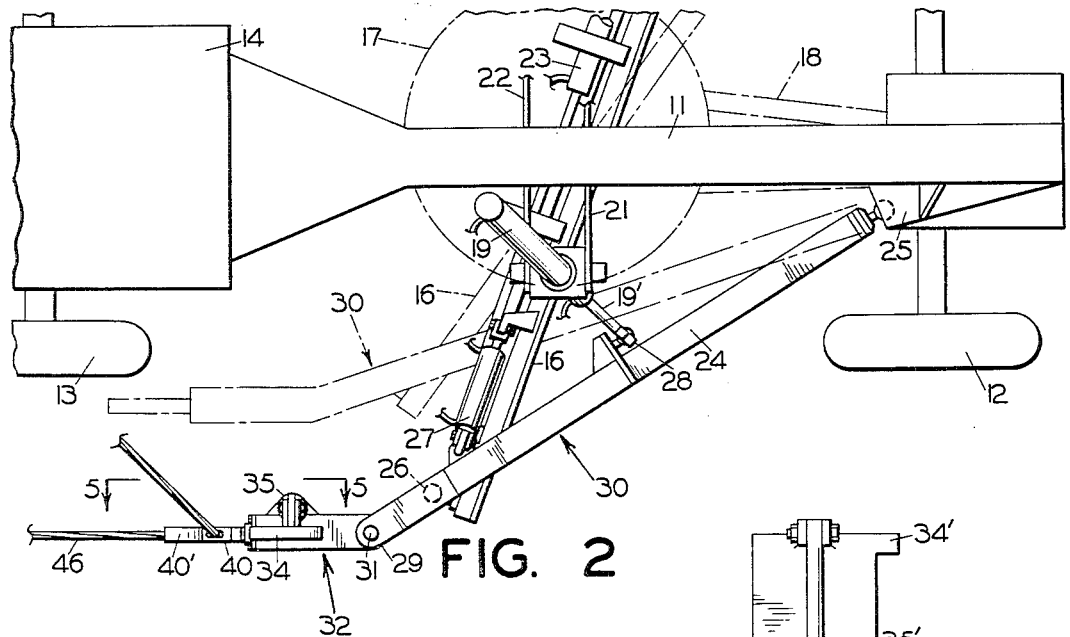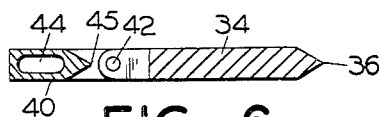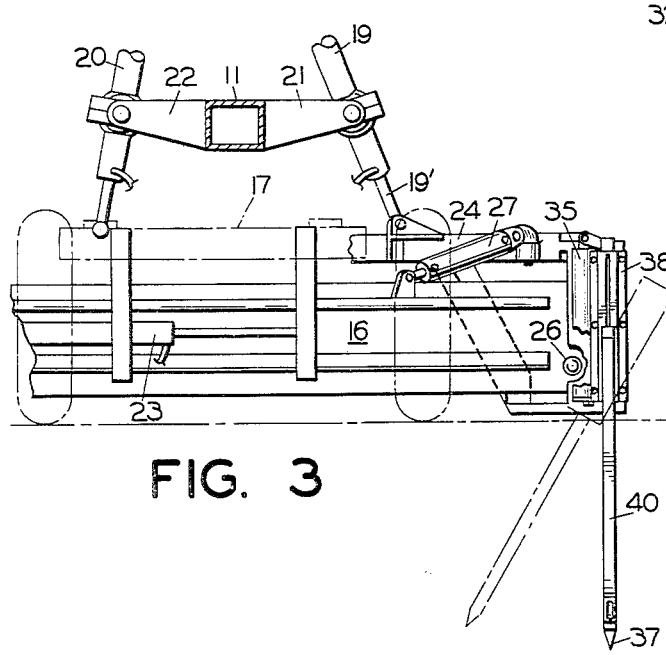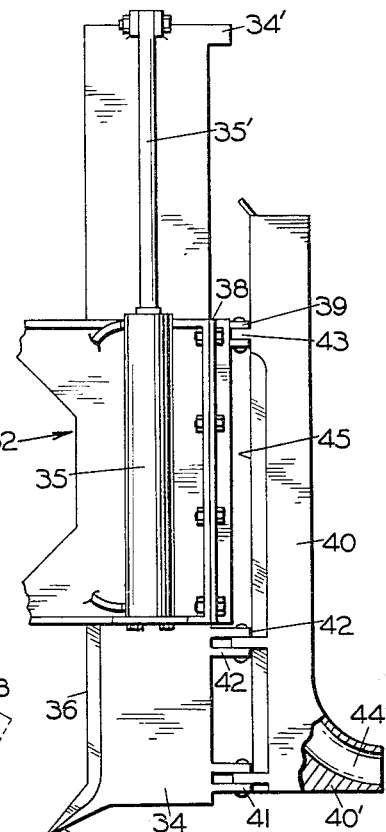

United States Patent Office 3,486,344
Patented Dec. 30, 1969

3,486,344
CABLE-LAYING ATTACHMENT FOR ROAD
GRADER VEHICLE
William A. Ylinen, 4605 NE. 35th Ave.,
Portland, Oreg. 97211
Filed May 1, 1968, Ser. No. 725,646
Int. Cl. E02f 5/02; H02g 1/06; F16l 1/00
U.S. Cl. 61—72.6                             4 Claims

ABSTRACT OF THE DISCLOSURE

Attachment for a road grader vehicle for the purpose of enabling the vehicle to lay a continuous cable in the ground; the attachment connected to the front portion of the vehicle at one side and connected to the corresponding outer end of the vehicle moldboard, with additional adjustable means connecting the attachment and moldboard for causing the attachment to tip on its longitudinal axis; a plow and associated cable-laying shoe on said attachment; and a cable-dispensing drum carried on the vehicle.

BACKGROUND OF THE INVENTION

Several devices have been developed heretofore for laying a cable in the ground, which devices have included a plow and associated means for feeding the cable down into the trench formed by the plow as the plow is drawn along through the ground. An early example of such device is shown in U.S. Patent No. 1,863,671, issued June 21, 1932. Similar devices are shown in U.S. Patents No. 3,170,300 and 3,175,368, issued Feb. 23, 1965 and Mar. 30, 1965, respectively. In these devices a track-laying tractor is required as the traction element. A more recently developed device of this nature, shown in U.S. Patent No. 3,307,363, issued Mar. 7, 1967, uses a wheeled vehicle, instead of a track-laying tractor, to provide the tractional force.

The device of the present invention, like that described in the last of the above mentioned patents, is designed for a wheeled vehicle. However, the object of the present invention is to provide similar improved cable-laying means which will be in the nature of an attachment for a common and well known type of road grader vehicle, and adapted to be readily mounted on such a vehicle without any major construction change on the vehicle or excessive installation cost.

SUMMARY OF THE INVENTION

The cable-laying attachment of the present invention includes an elongated main frame carrying a plow with attached cable guide shoe. The forward end of the main frame is attached by universal joint means, preferably a ball and socket joint, to a bracket which is required to be installed on the right side of the front portion of the road grader. The main frame in addition is attached by universal joint means, also preferably including a ball and socket joint, to the adjacent end of the moldboard of the vehicle, so that adjustment of the moldboard, by the customary means provided on the road grader, results in adjustment of the main frame of the attachment, and therewith of the plow and cable shoe, laterally with respect to the body of the vehicle. In addition, a hydraulic cylinder and piston assembly having one end connected with the main frame of the attachment, is connected up at the other end with the moldboard and provides means whereby the entire attachment may also be tilted on its longitudinal axis when this is desirable.

BRIEF DESCRIPTION OF THE DRAWINGS

In the drawings:
FIG. 1 is a side elevation of the attachment showing the same mounted on a road grader vehicle, the attachment being shown in full lines in lowered normal operating position and its raised inoperative position being indicated in broken lines;

FIG. 2 is a corresponding top plan view of the attachment and of a portion of the vehicle, taken on line 2—2 of FIG. 1, showing in full lines the attachment and vehicle moldboard in extended lateral outward position, and showing in broken lines the same in inward position with respect to the vehicle;

FIG. 3 is a fragmentary sectional elevation on line 3—3 of FIG. 1;

FIG. 4 is a fragmentary section on line 4—4 of FIG. 1, drawn to a larger scale;

FIG. 5 is a fragmentary sectional elevation on line 5—5 of FIG. 2, drawn to a larger scale; and FIG. 6 is a section on line 6—6 of FIG. 1, drawn to a larger scale.

Referring first to FIG. 1, the reference 10 indicates in general a well known type of road grader vehicle having a main frame structure 11 supported by forward ground-engaging wheels 12 and rear ground-engaging wheels 13, the main frame structure carrying the usual cab 14 and the power supply source contained within a housing 15. The road grader vehicle also has the customary moldboard or scraper blade 16 which is longitudinally slidable to a limited extent in support means, which support means is in turn mounted for partial rotation in a guide frame (indicated in broken lines at 17) carried on a draw bar (indicated in broken lines at 18), the forward end of the draw bar being attached by universal joint means (not shown) to the forward end of the frame of the vehicle. The rear portion of the draw bar 18 and the guide frame 17 are supported from the main frame 11 through the intermediary of a pair of hydraulic cylinder assemblies 19 and 20 (see also FIGS. 2 and 3) located at opposite sides of the main frame 11 and supported through suitable universal joint mounting in brackets 21 and 22 respectively secured to opposite sides of the main frame, the bottom ends of the piston rods of these hydraulic cylinder assemblies being connected by universal joint means (such as ball and socket joints) with the guide frame 17 of the moldboard assembly. Thus the endwise tilting and the raising or lowering of the moldboard are controlled by the hydraulic cylinder assemblies 19 and 20. An additional hydraulic cylinder 23 (FIG. 3) controls the longitudinal or endwise adjusting of the moldboard in its support means.

The road grader vehicle as thus far described is well known and further details of its construction and method of operation are unnecessary.

The cable-laying attachment of the present invention, which attachment is indicated as a whole by the reference character 30 in FIGS. 1 and 2, includes an elongate composite beam member 24, preferably shaped substantially as shown in FIG. 1. The forward end of this beam member is connected by universal joint means, for example by a ball and socket, to a bracket 25 which, when the attachment is mounted on the vehicle, is firmly secured, by welding or other suitable means, to the right side of the forward end portion of the main frame structure 11 of the road grader vehicle. When the attachment is mounted on the vehicle the beam 24 is also attached to the adjacent end of the moldboard 16 of the vehicle by means of a ball and socket assembly 26 (FIGS. 1 and 4). Thus, endwise or longitudinal adjustment of the moldboard 16 by the customary hydraulic cylinder assembly 23 (the accompanying partial rotation of the moldboard assembly being accommodated by the supporting guide frame 17), will cause the beam member of the cable-laying attachment to swing outwardly or inwardly with respect to the road grader vehicle as desired, for example, will cause the beam member 24 to swing from the broken line position in FIG. 2 to the full line position, or vice versa.

Furthermore, the beam member 24 is also connected with the moldboard of the vehicle at a higher level by a hydraulic cylinder assembly 27 (FIGS. 1, 2, and 3). The outer end of the cylinder in this assembly is attached by a substantially universal joint connection to the upper portion of the beam member 24, and, when the attachment is connected to the vehicle, a substantially universal joint connection is provided on the portion of the moldboard 16 for the opposite outer end of the piston rod of this hydraulic cylinder assembly 27. The operation of this hydraulic cylinder assembly 27 enables the beam member 24, and therewith the rest of the cable-laying attachment later described, to be specially tilted on its longitudinal axis when desired, for a purpose later explained.

Preferably, although not necessarily, when the cable-laying attachment is connected to the road grader vehicle the piston rod 19' of the hydraulic cylinder assembly 19 on the vehicle (by which hydraulic cylinder assembly the guide frame 17 for the moldboard support means and the draw bar 18 are supported from the main frame structure of the vehicle at one side as previously described), is disconnected from its ball and socket connection on the guide frame 17, and instead is connected directly to the beam member 24 through a similar ball and socket connection, as indicated at 28 in FIG. 2. This arrangement is considered preferable since it enables a considerable portion of the weight of the attachment to be supported directly through the hydraulic cylinder assembly 19 instead of being indirectly supported through the moldboard, moldboard support means, guide frame and hydraulic cylinder 19, thus making a somewhat steadier support mounting for the cable-laying attachment, especially when the attachment is employed in an extreme outward position. In either case, however, the customary hydraulic cylinder assembly 19 on the vehicle is utilized to perform a major adjustment, namely the raising and lowering of the entire cable-laying attachment when mounted on the vehicle. Thus the present invention avoids the necessity of providing any special additional mechanism and control which would otherwise have to be installed for this purpose, and which is required with some other cable-laying devices of the same general nature.

A plow blade carrier, plow and cable shoe are carried at the rear end of the beam member 24 of the attachment. This rear end of the beam member 24 is formed with upper and lower rearwardly-extending lugs 29 and 29' which carry a hinge pin 31. A plow blade carrier 32 has a pair of forwardly-extending lugs through which the hinge pin 31 passes, thereby providing a hinged mounting on the end of the beam member 24 for the plow blade carrier and certain other members presently mentioned, which in turn are supported on the plow blade carrier.

A rectangular channel 33 (FIG. 4) extending down through the carrier 32 slidingly accommodates the plow blade 34. A hydraulic cylinder 35 (FIG. 5) mounted on the inside face of the carrier 32 has a piston rod 35', the top end of which is attached to the top cap 34' on the plow blade and provides the means by which the plow blade is raised or lowered with respect to the carrier. The plow blade 34 has a sharpened forward or leading edge 36 which terminates at the bottom in a forwardly-downwardly-extending tooth 37.

The rear side of the rectangular channel 33 on the carrier 32 is closed by an end plate 38 (FIG. 4) formed with an exterior guideway for a slide member 39. A cable guide shoe 40 is hingedly attached to the lower portion of the rear edge of the plow blade 34 at the hinge connections 41 and 42 as shown in FIGS. 1 and 5, and is also hingedly attached to the slide member 39 by the hinge connection 43. Thus the raising or lowering of the plow blade in the plow blade carrier causes the cable guide shoe 40 to be correspondingly raised or lowered.

The cable guide shoe 40 is shaped substantially as shown in FIGS. 1 and 5, having a channel 44 extending down through the shoe for the cable being laid in the ground. The bottom end of the cable guide shoe 40 has a rearward extension 40' and the channel 44 in the shoe turns rearwardly in this bottom portion as shown at 44' in FIG. 5. Preferably, the front edge of the cable guide shoe 40 is sharpened as shown at 45 in FIGS. 1 and 5.

FIG. 4 shows a plow blade of maximum thickness for the carrier 32 in the rectangular channel 33 of the carrier. However, it is possible and feasible to substitute plow blades of less thickness for the blade 34. The thickness of the plow blade (and cable guide shoe) should not be any greater than the circumstances (mainly the diameter of the cable being laid) require. The manner in which the cable shoe is attached to the blade and blade holder (thus the hinge connections 41 and 42 with the bottom portion of the blade and the hinge connection 43 with the slide member 39 on the carrier) not only enable substitutions in the blade and shoe to be made easily but also enable the blade and shoe to be raised relatively higher with respect to the carrier (as shown in FIG. 5) than is possible with other known cable-laying devices of this general type.

The cable 46 to be laid in the trench cut by the plow passes down through the channel 44, 44' in the guide shoe. The cable may be fed down through the guide shoe in any desired manner from the supply source. However, preferably in the carrying out of the present invention, a pair of hinge arms 48, extending in parallel vertical planes (one of which arms is shown in FIG. 1), are hinged to a cross plate mounted on the rear of the vehicle, a hydraulic cylinder (indicated at 48' in FIG. 1), has its bottom end hingedly mounted on the vehicle and its piston rod hingedly connected to a bar joining the hinge arms 48. The pair of arms 48 provide support for the ends of a shaft on which the cable drum 47 can be carried, and the raising of the arms 48 thus enables the cable drum to be lifted from the ground and carried in cable-dispensing position on the vehicle.

With this preferred arrangement for carrying the cable supply, a first cable guideway 49, provided with suitable guides, is mounted on the vehicle as shown in FIG. 1. The cable then passes through a second guideway 50 on the post 51 mounted on the vehicle. A hinged arm 53 on the post 51 ends in a yoke in which a guide pulley 52 is mounted and over which pulley the cable passes. The hinged arm 53 is resiliently supported through the medium of a pair of telescoping brace members 54 and 55, the telescoping action of which is resisted by a compression coil spring 56. When the cable is not being adequately dispensed from the mounted drum, or when there is too much tension on the cable, this fact will be indicated by the lowering of the pulley 52 and arm 53 against the force of the spring 56.

Ordinarily during the travel of the vehicle with the mounted attachment operating, the plow blade carrier 32, and therewith the plow blade 34 and cable guide shoe 40, will be substantially vertical, their location out from the side of the vehicle being adjustably controlled by the endwise shifting of the moldboard as previously explained. Occasionally, as is well known in the laying of cables along a roadway, it may be desirable temporarily to slope the cable trench inwardly or outwardly to avoid a special obstruction or to pass the cable beneath a shoulder extension on the roadway. The tipping of the plow blade and cable guide shoe transversely from the substantially vertical position is accomplished by causing the beam member 24 of the attachment to be tilted on its longitudinal axis through the operation of the hydraulic cylinder assembly 27, previously referred to. However, when no tipping of the plow blade and cable guide shoe from normal substantially vertical position is required, and thus when the hydraulic cylinder assembly 27 is not operated, the fact that the beam member 24 is connected to the moldboard by both the hydraulic cylinder assembly 27 and by the lower ball and socket assembly 26 enables the plow blade and cable guide shoe to be kept in the same position (for example, substantially vertical) regardless of the outward or inward swinging of the cable-laying attachment through the endwise or longitudinal adjusting movement of the moldboard 16. In other words, the positioning of the plow blade and cable guide shoe outwardly or inwardly, with respect to the road grader vehicle on which the cable-laying attachment is mounted, will not of itself cause any tilting of the attachment on its longitudinal axis. This is an important feature of the invention and one of the features which distinguish this attachment from other somewhat similar cable-laying machines in which the lateral outward or inward movement of the plow and cable shoe automatically produce some transverse tipping of the same unless additional means is operated to prevent this.

Thus, the device of the present invention enables any standard road grader vehicle to function also as a cable-laying machine with very little change required in the vehicle for accommodating the cable-laying attachment. Actually all that is required, beyond the securing of the front bracket 25 of the attachment to the front end of the vehicle, is the mounting of the ball and socket joint connection between the beam member 24 of the attachment and the vehicle moldboard, the installation of the hydraulic cylinder assembly 27 for also connecting the beam member 24 with the moldboard, and the connecting of the hydraulic lines for the hydraulic cylinder assembly 27 and the hydraulic cylinder assembly 35 with the power plant on the vehicle, unless the special means described for carrying the cable drum and for feeding the cable to the cable guide is also desired, in which case this latter means, including the additional hydraulic cylinder 48' is installed on the rear of the vehicle. However, this latter also does not involve any excessive work or cost.

I claim:

1. Cable-laying attachment for a road grader vehicle of the character described including an elongated main frame, a plow blade carrier mounted on the rear end of said main frame, a plow blade supported by said carrier, a cable guide shoe supported by said carrier and said blade, means including a universal joint connecting the forward end of said main frame with the front portion of the vehicle at one side, a universal joint assembly connecting said main frame and the vehicle moldboard, and a hydraulic cylinder assembly coupled with said main frame and with said moldboard, whereby the position of said main frame, and therewith of said blade and cable guide shoe, with respect to the vehicle can be controlled by adjustment of the moldboard in the vehicle and the adjustment of said hydraulic cylinder assembly.

2. The cable-laying attachment of claim 1 with said plow blade carrier having a substantially rectangular channel extending down through said carrier, with an end plate on said carrier forming the rear wall of said channel, said plow blade being slidingly mounted in said channel, and a hydraulic cylinder assembly for controlling the position of said blade in said channel.

3. The cable-laying attachment of claim 2 with an exterior guideway on said end plate on said carrier, a slide member in said guideway, and with hinged elements connecting the lower portion of said cable guide shoe with the lower portion of said blade and the upper portion of said cable guide shoe with said slide member.

4. The cable-laying attachment of claim 3 with the addition of cable drum supporting means mountable on the vehicle and means for feeding the cable down through said guide shoe, said latter mentioned means including a spring-mounted pulley for the cable so arranged that excessive tension on the cable will cause said pulley to be lowered against the force of its spring mounting.

References Cited

UNITED STATES PATENTS

| | | | |
|---|---|---|---|
| 2,673,409 | 3/1954 | Briscoe | 37—98 |
| 3,308,628 | 3/1967 | Nichols | 61—72.6 |
| 3,307,363 | 3/1967 | Kinnan | 61—72.6 |
| 3,431,741 | 3/1969 | Kinnan | 61—72.6 |

JACOB SHAPIRO, Primary Examiner

U.S. Cl. X.R.

37—98; 172—784